United States Patent [19]

Naito et al.

[11] 4,362,495

[45] Dec. 7, 1982

[54] EXTRUSION DEVICE FOR FORMING A HONEYCOMB STRUCTURE

[75] Inventors: Junichiro Naito, Toyokawa; Shinichi Yamamoto, Takahama; Zituo Suzuki, Aichi; Mitsuru Asano, Okazaki, all of Japan

[73] Assignee: Nippon Soken, Inc., Nishio, Japan

[21] Appl. No.: 214,984

[22] Filed: Dec. 10, 1980

[30] Foreign Application Priority Data

Dec. 12, 1979 [JP] Japan .............................. 54/162103

[51] Int. Cl.³ .............................................. B29F 3/04
[52] U.S. Cl. ............................ 425/376 A; 264/177 R; 264/209.1; 425/380; 425/461; 425/463; 425/466; 428/116
[58] Field of Search ............................. 425/380–381, 425/463, 464, 461, 466, 467, 382 R, 197–199, 462, 376 A; 264/177 R, 209.1; 428/116

[56] References Cited

U.S. PATENT DOCUMENTS

| | | | |
|---|---|---|---|
| 3,790,654 | 2/1974 | Bagley | 264/209.1 |
| 3,836,302 | 9/1974 | Kaukeinen | 425/461 |
| 3,947,214 | 3/1976 | Cunningham | 425/380 |
| 3,981,657 | 9/1976 | Orso et al. | 425/199 |
| 4,008,033 | 2/1977 | Folmar et al. | 425/380 |
| 4,168,944 | 9/1979 | Morikawa et al. | 425/382 R |
| 4,178,145 | 12/1979 | Hamamoto et al. | 425/199 |
| 4,233,351 | 11/1980 | Okumura et al. | 428/116 |
| 4,243,370 | 1/1981 | Higuchi et al. | 425/462 |
| 4,259,057 | 3/1981 | Abe et al. | 425/463 |

FOREIGN PATENT DOCUMENTS 1577201  8/1969  France .............................. 425/467

*Primary Examiner*—Jeffery R. Thurlow
*Attorney, Agent, or Firm*—Cushman, Darby & Cushman

[57] ABSTRACT

An extrusion device comprises a die provided with feed passageways and grid-shaped extrusion slots of which width is made larger in the outer peripheral portion compared with those of the central portion of the die. By the above extrusion device, a honeycomb structure having a thicker walled outer peripheral portion can be obtained without any distortion.

9 Claims, 9 Drawing Figures

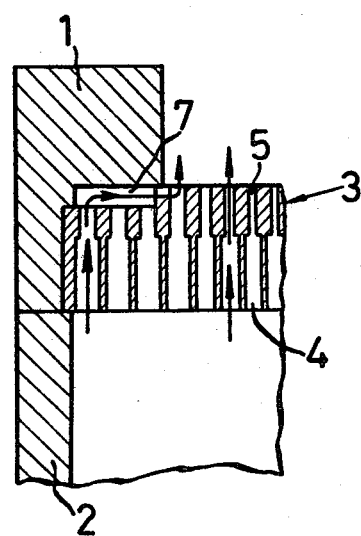

EXTRUSION DEVICE FOR FORMING A HONEYCOMB STRUCTURE

BACKGROUND OF THE INVENTION

The present invention relates to a device for extruding honeycomb structures which are used as catalyst supports, heat exchangers or filters.

Conventionally, the mechanical strength of the whole of the ceramic honeycomb structure or of the outer peripheral portion thereof has been improved by forming an outer wall B having a thicker wall than that of a grid-shaped wall A, in the outer periphery of the honeycomb structure as shown in FIG. 1.

For extruding such a honeycomb structure as described above, devices as shown in FIGS. 2 and 3 are conventionally used.

These devices are provided with a die mask 1 having an inner surface 6 of a smaller diameter than an extrusion die 3, in the outer periphery of the outlet side of the extrusion die 3 disposed within a cylinder 2 respectively.

The extrudable material which was supplied from the cylinder 2 passes feed passageways 4 and grid-shaped extrusion slots 5 which are formed within the die 3, under pressure to be extruded therefrom.

Then, the extruded body is formed by the inner wall 6 of the die mask 1 into a predetermined outer form and the thick outer wall is also formed.

However, according to the device of FIG. 2, the material is pressed by the tapered inner surface 6 of the die mask 1 toward the center thereof after being extruded out of the die 3. Therefore, distortion is easy to occur in the connecting portion C between the grid-shaped wall A and the outer wall B of the obtained honeycomb structure as shown in FIG. 4. As a result, the mechanical strength of the connecting portion C is decreased.

And in the device of FIG. 3, the die mask 1 which is contacted with the die 3 is provided with an opening portion 30 in the whole circumference of the inner wall 6 thereof.

In the outer periphery of the obtained product, the thick outer wall is formed by the material which is supplied from the extrusion slots of the outer peripheral portion of the die 3 through the opening portion 30.

However, according to the device of FIG. 3, since the connecting portion C shown in FIG. 4 is crushed by the material supplied to the outer periphery of the extruded body, distortion is easy to occur therein.

Furthermore, since the thickness of the outer wall of the honeycomb structure is largely different from that of the grid-shaped wall thereof, the heat transfer from the grid-shaped wall portion into the outer wall becomes discontinuous in the connecting portion therebetween, or the inclination of the heat transfer abruptly changes therein when the conventional honeycomb structure is used in the exhaust gas purifying device of an automobile. As a result, the honeycomb structure is easy to be broken in the connecting portion.

These drawbacks of the honeycomb structure are inevitable when it is extruded by the devices shown in FIG. 2 and FIG. 3. And these drawbacks are caused by the defects of the conventional extrusion devices.

The present inventors in part and their coinventor Okumura have proposed one honeycomb structure as shown in FIG. 5 in U.S. Pat. No. 4,233,351 wherein the defects of the conventional honeycomb structure can be overcome.

In the honeycomb structure shown in FIG. 5, the wall thickness of each open passage positioned in the outer peripheral portion thereof is larger than that of each open passages positioned in the central portion thereof.

This honeycomb structure has a sufficiently larger strength against thermal shock compared with the conventional honeycomb structure of which only the outer wall has an extremely large thickness.

Accordingly, one object of the present invention is to provide an extrusion device for producing honeycomb structures having an excellent mechanical strength and thermal shock resistance.

Another object of the present invention is to provide an extrusion die for producing honeycomb structures wherein the wall thickness of the open passages positioned in the outer peripheral portion thereof is larger than that of those positioned in the central portion thereof and no distortion is observed in the wall of any open passages.

DESCRIPTION OF THE DRAWINGS

Other objects and advantages of the invention will become apparent from the following description of embodiments with reference to the accompanying drawings wherein:

FIG. 9 is a sectional view of a second embodiment of a device of the present invention.

SUMMARY OF THE INVENTION

An extrusion device of the present invention comprises a die provided with disconnected feed passageways and interconnected grid-shaped extrusion slots of which width is made larger in the outer peripheral portion compared with those of the central portion of the die. By the above extrusion device, a honeycomb structure having a thicker walled outer peripheral portion can be obtained without any distortion.

DETAILED DESCRIPTION OF THE INVENTION

Hereinafter, the present invention will be explained in accordance with embodiments of the present invention.

Figure 6:
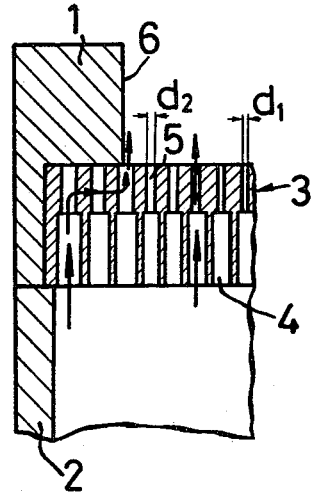
FIG. 6 is a sectional view of a first embodiment of a device of the present invention.
Figure 7:
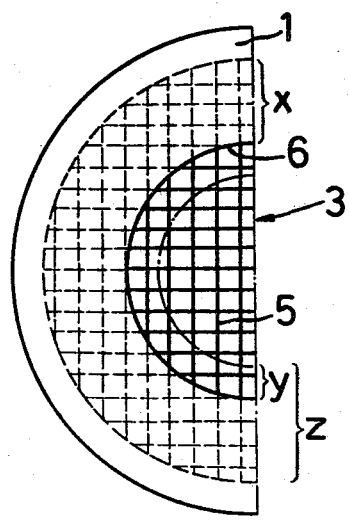
FIG. 7 is a plane view of FIG. 6.
Figure 8:
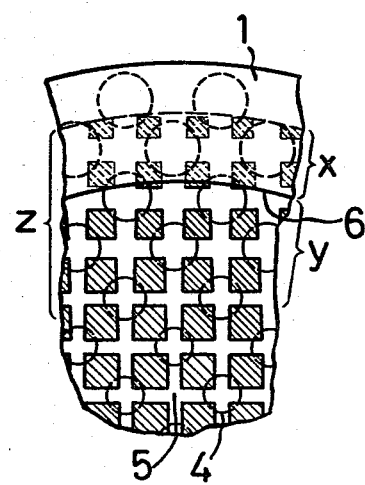
FIG. 8 is a partially enlarged plane view of FIG. 7.

In a first embodiment shown in FIGS. 6 to 8, a die 3 having a circular cross section is fixed between a cylinder 2 and a die mask 1 which is attached to the top end thereof.

In the die 3, circular feed passageways 4 are disconnectedly formed from one end surface thereof on the side of the cylinder 2, that is the extrudable material inlet side. And from the other end surface of the die 3 on the side of the die mask 1, that is the extrudable material outlet side, interconnected grid-shaped extrusion slots 5 are formed. Each feed passageway 4 and each extrusion slot 5 are communicated with each other in the axially central portion of the die 3.

The other end surface of the die 3 is closely contacted with the opposed end surface of the die mask 1.

A circular inner surface 6 of the die mask 1 which is disposed on the extrudable material outlet side of the die 3, and the die 3 are coaxially positioned. And the diameter of the inner surface 6 is made smaller than that of the die 3.

The extrusion slots 5 are formed so that the width ($d_2$) of those positioned in the outer peripheral portion of the die 3 is larger than that ($d_1$) of those positioned in the central portion thereof.

The extrusion slots 5 having a larger width are formed in the z zone including the x zone which is covered by the die mask 1 and the y zone which lies along the inner periphery of the x zone as shown in FIG. 7.

The preferable width of the y zone is within the range of two extrusion slots to five extrusion slots.

The width of the extrusion slots positioned in the z zone can be continuously increased from the y zone to the x zone as shown in FIG. 8, increased by stages from the y zone to the x zone or made equally larger than that of the central portion.

The width ($d_2$) of the extrusion slots positioned in the outer peripheral portion is selected under the condition of $d_1 < d_2 < 3d_1$. And the width ($d_2$) is made smaller than the diameter of each feed passageway 4 as a matter of course.

As the means for partially enlarging the extrusion slots, electric discharging machining, lapping by use of a polishing material or other conventional means is employed.

In the extrusion device of the present invention, the width of the feed passageways is made uniform or is increased toward the outer wall of the die as shown in FIG. 8.

In the extrusion device having the above described structure, the extrudable material such as ceramic which was supplied from the cylinder 2 under pressure is extruded out of the die 3, passing the feed passageways 4 and the extrusion slots 5 of the die 3. Then, the obtained extruded body moves along the inner surface 6 of the die mask 1 so that the honeycomb structure composed of the grid-shaped wall portion of which thickness is larger in the outer peripheral portion thereof and a large number of open passages surrounded by the wall portion can be obtained.

In this case, the extrudable material supplied into the extrusion slots of the x zone is then supplied under pressure through the transversely extending extrusion slots toward the center of the die 3 as indicated by the arrow shown in FIG. 6, and then is flowed into the extrudable material which was supplied into the extrusion slots of the y zone.

And the extrudable material supplied into the y zone is flowed into that supplied into the central portion of the die 3 and then the extrudable material is extruded out of the die 3.

Figure 4:
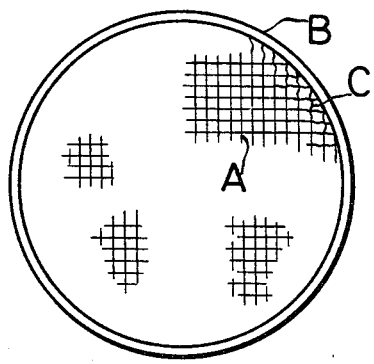
FIG. 4 is a plane view showing another example of the honeycomb structure which is obtained by the conventional device.
Figure 5:
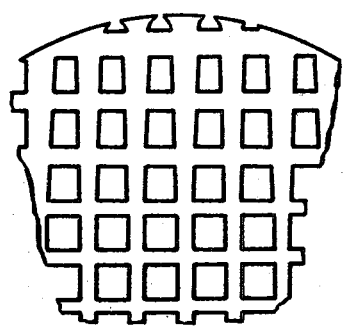
FIG. 5 is an enlarged plane view of a honeycomb structure which is produced by a device of the present invention.

The obtained honeycomb structure has such a cross section as shown in FIG. 5 for example, and such distortion as occurs in the portion C of FIG. 4 does not occur in the wall thereof.

In a second embodiment shown in FIG. 9, the outer peripheral portion of the die 3 on the extrudable material outlet side is cut away along the circumference thereof by a predetermined depth.

And there is formed a pooling slot 7 for the extrudable material between the cut outer peripheral portion of the die and the die mask 1. Other structure of the extrusion device of the second embodiment is similar to that of the first embodiment.

By providing the pooling slot 7, the extrudable material which was supplied into the outer peripheral portion of the die 3 can be promoted to flow into the central portion thereof.

Figure 1:
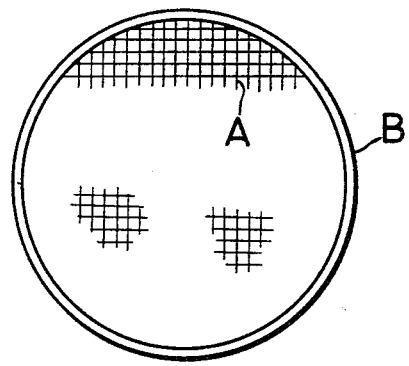
FIG. 1 is a plane view of a cross section of a conventional honeycomb structure.
Figure 3:
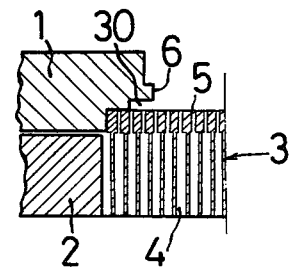
FIG. 3 is a sectional view showing another example of the conventional device.
Figure 2:
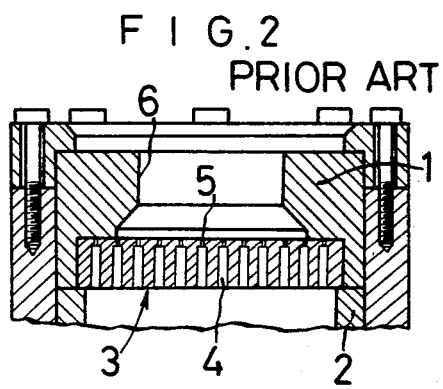
FIG. 2 is a sectional view showing one example of the conventional devices for forming the honeycomb structure shown in FIG. 1.

The experimental result on the squeezing strength and the thermal shock strength of the honeycomb structures which were obtained by means of the extrusion devices of the first and second embodiments and the conventional extrusion device of FIG. 2 is shown in the following table.

Any honeycomb structure has a diameter of 5 inch, a length of 3 inch and 300 open passages per square inch of the cross sectional area thereof.

The width ($d_1$) of the extrusion slots of the central portion of the first and the second embodiments ranges from 0.3 to 0.32 mm, and the width ($d_2$) of those of the outer peripheral portion ranges from 0.34 to 0.5 mm.

And the wall thickness of the outer wall of the honeycomb structures obtained by the conventional extrusion device is 2 mm.

|  | SQUEEZING STRENGTH ($kg/cm^2$) | THERMAL SHOCK STRENGTH (times) |
| --- | --- | --- |
| EMBODIMENT 1 | 950 | 11 ~ 13 |
| EMBODIMENT 2 | 1050 | 10 ~ 12 |
| CONVENTIONAL STRUCTURE | 920 | 5 ~ 6 |

The squeezing strength was measured by applying load in the direction perpendicular to the axial direction of the open passages. And the thermal shock strength was measured by repeating the cycle of holding each honeycomb structure within an electric furnace at 850° C. for 50 minutes, taking out it from the furnace and cooling it at a room temperature for 50 min. until each honeycomb structure was broken.

As is apparent from the above experimental result, the honeycomb structures which were obtained by the devices of the present invention have excellent squeezing strength and thermal shock strength compared with those obtained by the conventional extrusion devices.

Furthermore, the die mask which was used in the embodiments of the present invention, is unnecessary when the outer peripheral form of the honeycomb structure does not require high accuracy.

As described above, according to the present invention, a honeycomb structure having an excellent mechanical strength and thermal shock strength can be obtained by using a very simple die of which extrusion slots have partially different width.

Having now fully described the invention, it will be apparent to one of ordinary skill in the art that many changes and modifications can be made thereto without departing from the spirit or scope of the invention as set forth herein.

What is claimed is:

1. An extrusion device for forming a honeycomb structure provided with a large number of axially extending open passages which are separated by thin wall, out of an extrudable material, comprising:
   a die provided with a large number of disconnected feed passageways which are formed on an extrudable material inlet side thereof in the axial direction thereof, and a large number of interconnected grid-shaped extrusion slots which are formed on an extrudable material outlet side thereof and communicated with said feed passageways; and
   a cylindrical die mask disposed on said outlet side and having a central aperture coaxial with said die,
   said mask being disposed to cover an outer ring of extrusion slots with said aperture leaving uncovered an inner circular area of extrusion slots,
   the uncovered extrusion slots in the outer peripheral portion of said inner circular area having a width larger than those of the central portion of said circular area,
   the arrangement being such that extrudable material fed to the covered outer ring of extrusion slots is caused to flow laterally to the said uncovered wider extrusion slots via the said interconnection thereof and axially outwardly through said wider slots to aid in providing a continuous homogenous honeycomb structure.

2. An extrusion device according to claim 1, wherein: said uncovered extrusion slots in outer peripheral portion of said circular area is composed of two to five extrusion slots in the radial direction thereof.

3. An extrusion device according to claim 1, wherein: said uncovered extrusion slots of said outer peripheral portion of said circular area have a width less than three times as large as that of those of said other portion thereof.

4. An extrusion device according to claim 1, wherein: the width of said wider extrusion slots of said outer peripheral portion of said circular area is equal to each other.

5. An extrusion device according to claim 1, wherein: the width of said extrusion slots of said outer peripheral portion of said circular area is continuously increased toward the outer periphery of said circular area.

6. An extrusion device according to claim 1, wherein: the width of said extrusion slots of said outer peripheral portion of said circular area is increased toward the outer periphery of said circular area by stages.

7. An extrusion device according to claim 1, wherein: the outer part of said die which is covered by said mask is closely contacted with the opposed surface of said die mask.

8. An extrusion device according to claim 1, wherein: the outer part of said die which is covered by said mask is cut away by a predetermined depth along the circumference thereof to form a pooling slot for said extrudable material between said cut outer part and said die mask.

9. An extrusion device according to claim 1, wherein: said feed passageways situated in said outer peripheral portion of said inner circular area have a diameter larger than that of other more central feed passageways in accordance with the width of said extrusion slots.

* * * * *